United States Patent [19]

Fernandez

[11] 4,150,803
[45] Apr. 24, 1979

[54] TWO AXES CONTROLLER

[76] Inventor: Carlos P. Fernandez, 8692 Rath Cir., Huntington Beach, Calif. 92646

[21] Appl. No.: 839,647

[22] Filed: Oct. 5, 1977

[51] Int. Cl.$^2$ .............................................. B64D 37/00
[52] U.S. Cl. ............................ 244/135 A; 74/471 XY; 244/83 E; 74/491; 244/85
[58] Field of Search ................... 244/135 A, 223, 227, 244/228, 236; 214/762, 13, 14; 212/39 A, 39 MS; 74/471 XY, 475, 491; 137/351, 615

[56] References Cited

U.S. PATENT DOCUMENTS

| 1,818,834 | 8/1931 | Zimmerman | 244/135 A |
|---|---|---|---|
| 2,596,455 | 5/1952 | Williams | 244/135 A |
| 2,663,523 | 12/1953 | Leisy | 244/135 A |
| 2,670,913 | 3/1954 | Castor | 244/135 A |
| 2,692,102 | 10/1954 | Cobham | 244/135 A |
| 2,692,103 | 10/1954 | Cobham | 244/135 A |
| 2,716,527 | 8/1955 | Latimer | 244/135 A |
| 2,793,828 | 5/1957 | Rohtert | 244/135 A |
| 2,849,200 | 8/1958 | Person | 244/135 A |
| 2,859,002 | 11/1958 | Leisy | 244/135 A |
| 2,930,553 | 3/1960 | Greenbough | 244/117 A |
| 2,949,265 | 8/1960 | Person | 244/135 A |
| 2,960,295 | 11/1960 | Schulze | 244/135 A |
| 2,967,684 | 1/1961 | Knecht | 244/135 A |
| 3,055,620 | 9/1962 | Weiland | 244/135 A |
| 3,439,700 | 4/1969 | Preston | 137/351 |
| 3,599,907 | 8/1971 | Ransom | 244/135 A |
| 3,740,534 | 6/1973 | Kezer | 212/39 A |
| 3,917,196 | 11/1975 | Pond | 244/135 A |
| 4,069,720 | 1/1978 | Thor | 74/491 |

FOREIGN PATENT DOCUMENTS 1193008 5/1970 United Kingdom ................ 244/135 A

*Primary Examiner*—Trygve M. Blix
*Assistant Examiner*—Reinhard J. Eisenzopf

[57] ABSTRACT

A two axis controller for controlling a tanker aircraft in-flight refueling boom while maneuvering prior to engagement with the receiver aircraft and including a boom load alleviation system after engagement. Movement of the control stick is transmitted mechanically to a position transducer. The transducer provides a signal to an actuator to effect boom control. The transducer output is also transmitted to a servo motor which is mechanically connected to the control stick. During the free flight mode, when the operator is manually controlling the boom, the servo motor provides a resisting force to stick movement that varies as a function of the transducer signal. Following coupling of the two airplanes, which initiates the automatic load alleviation system, the same servo motor back drives the control stick in response to boom force and position signals to alleviate boom forces. Manual override of the automatic system is possible at any time.

12 Claims, 7 Drawing Figures

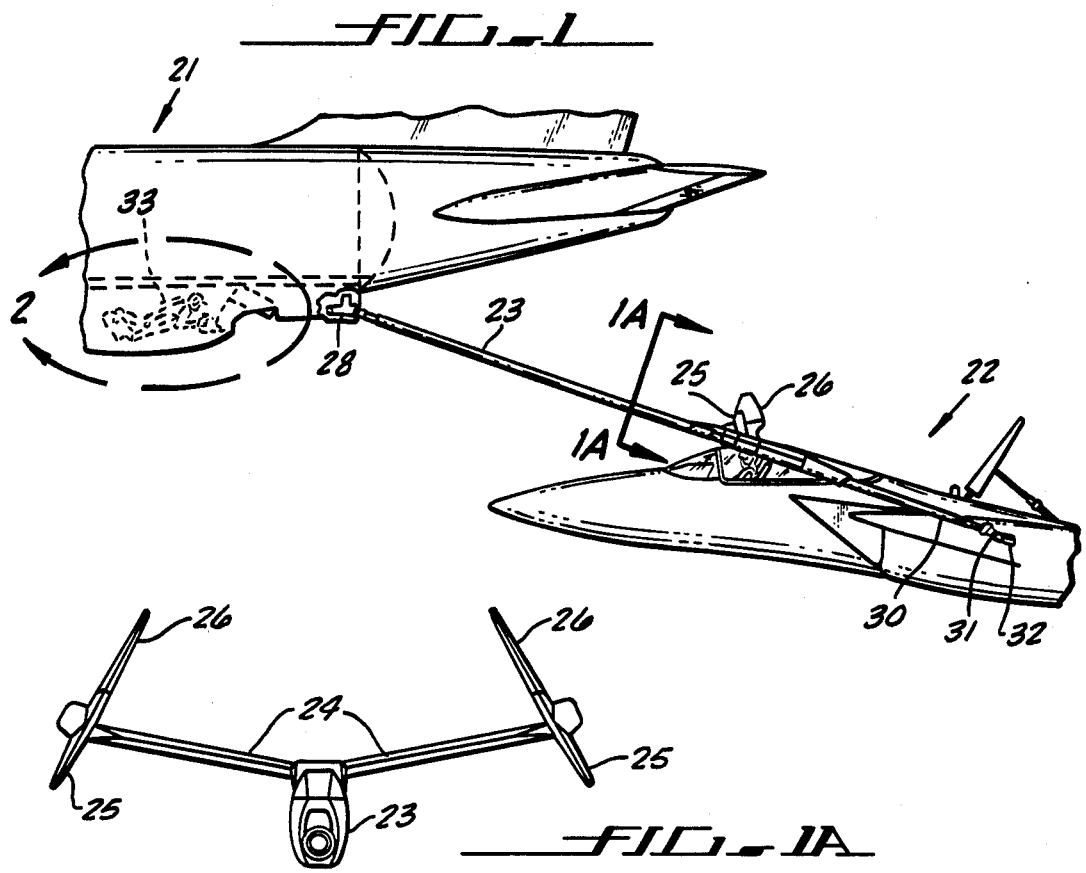
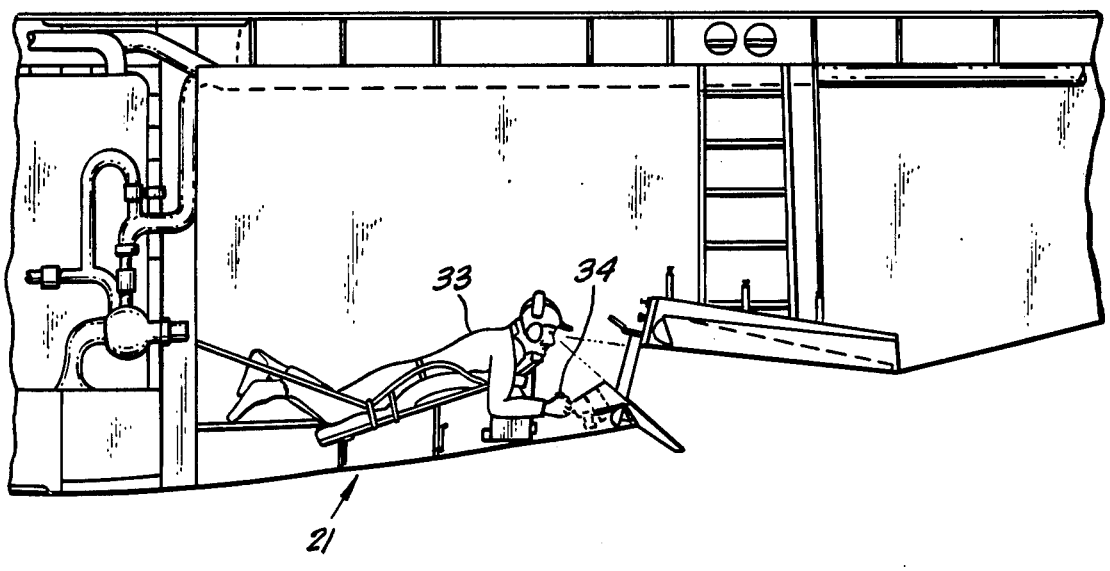

TWO AXES CONTROLLER

BACKGROUND OF THE INVENTION

This invention relates to a two axes control system for controlling a tanker aircraft boom during refueling operations.

While the primary use of the present invention is in the field of in-flight refueling of aircraft and it is generally described in that environment, the invention is also useful for related purposes. For example, this invention is useful wherever a single operating lever coordinates two axes of control, e.g. construction equipment or aircraft flight controls.

Currently, various systems are used for the in-flight refueling of receiver aircraft by another tanker aircraft. One system employs a drogue/probe device, where the receiver aircraft includes a probe which is literally flown into a drogue unit. The drogue is a funnel shaped receptacle attached to a long hose suspended from the tanker aircraft. While this system has enjoyed some success, it requires the various receiving aircraft to be capable of precise control, and carry a fixed or telescoping boom to support the probe. Since the refueling hose must be extended and retracted from the tanker, as on a reel, the hose must be small in diameter, severely restricting the rate of refueling.

Another system currently in vogue comprises a boom which extends downwardly and rearwardly from the tanker aircraft. The receiver aircraft connects to a nozzle located at the end of the boom. This invention is directed to improving the control of aerial boom type in-flight refueling systems.

One of the major problems characteristic of current aerial boom type in-flight refueling systems is boom whip upon disconnect. The magnitude of the boom excursion upon disconnect is a function of the stress in the boom created by failure of the boom to follow differential movement between the tanker and receiver aircraft. The existing systems require the boom operator to manually follow receiver aircraft excursions to alleviate boom stress. An object of this invention is to employ an automatic load alleviation system wherein boom forces and position are sensed and the resultant signals fed back and translated into boom control by automatically backdriving the stick to alleviate the boom forces. The automatic load alleviation mode of operation, however, allows for manual override of the system by the operator at any time.

Another object of this invention is to provide the operator control stick with an electro simulated variable rate feel system. The simulated feel system provides the operator with proper force feel characteristics while commanding the boom position. During the free-flight mode, the boom commander directs the boom position through a force feel control stick. Stick position, in turn, commands the boom control surfaces until the boom nozzle is in alignment with the receiving aircraft receptacle. Upon alignment, the operator extends the telescoping section of the boom to couple the nozzle and the receptacle.

Another object of this invention is to provide a control mechanism which may be easily and accurately controlled by the operator. The linkage mechanism shifts the center of rotation of the control stick from the mechanical pivot axis to a virtual pivot axis located essentially at the operator's wrist in the pitch axis of control. The control grip rotates about a longitudinal axis located under the operator's forearm to achieve lateral control by slight rotation of the forearm on the armrest.

SUMMARY OF THE INVENTION

In accordance with the principles of this invention, a controller for maneuvering a tanker aircraft in-flight refueling boom along with an automatic load alleviation system following coupling of the two aircraft is provided. The controller is provided with a control stick which is actuated in two mutually perpendicular planes for vertical and lateral control of the boom. Vertical control is initiated by rotation of the control stick handgrip in an arc about the operator's wrist. Lateral control is initiated by rotation of the stick in a lateral arc by rotation of the operator's forearm. Both stick manipulations are accomplished while the operator's forearm is supported on the armrest.

Movement of the control stick in either axis results in a corresponding movement of an associated position transducer. The transducer output signal commands the corresponding surface control actuator to effect boom control. The transducer output is also fed to a servo motor mechanically attached to each axis of the control stick. The servo motor either applies a resisting force on the stick or, in response to a signal produced by sensors that detect forces applied to the refueling boom, drives the stick and, in turn the boom, to alleviate boom forces. The former occurs during manual maneuvering of the boom to attain engagement with the receiver aircraft. The latter occurs after engagement of the two aircraft to minimize boom forces caused by differential movement of the two aircraft after engagement. However, the operator may manually override the load alleviation system at any time.

In accordance with further principles of this invention the control stick resisting force can be varied by the operator to create the "feel" desired.

It can be appreciated from the foregoing summary that the invention provides a new and improved controller for an aerial refueling boom. In addition, the invention is suitable for controlling any boom, the primary or accessory control system of an aircraft, or any mechanical element in two axes of angular or translational position control.

BRIEF DESCRIPTION OF THE DRAWINGS

The foregoing objects and many of the attendent advantages of this invention will become more readily appreciated as the same becomes better understood by reference to the following detailed description when taken in conjunction with the accompanying drawings, wherein;

FIG. 1 is a pictorial diagram illustrating two aircraft in the coupled mode for refueling purposes;

FIG. 1A is a view cut thru the boom to better show the boom control surfaces;

FIG. 2 is a pictorial diagram illustrating the boom operator in the prone position at the boom operator's station in the tanker aircraft with a control console;

DETAILED DESCRIPTION OF ILLUSTRATIVE EMBODIMENT

Figure 3:
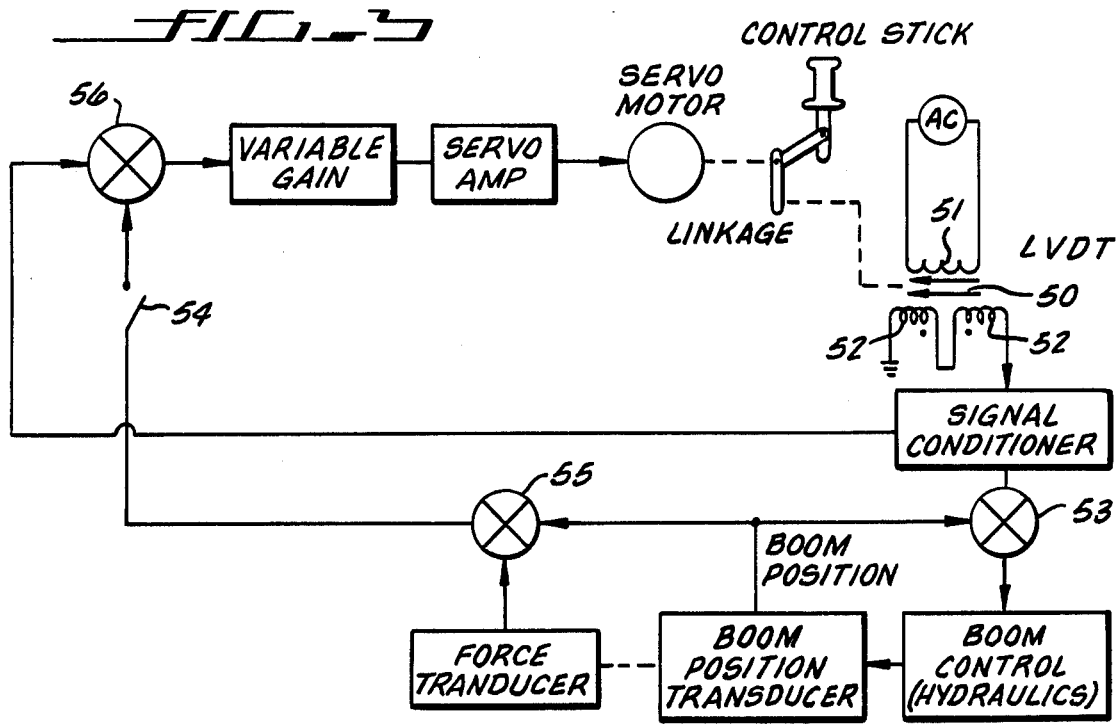
FIG. 3 is a simplified block diagram of one axis of the control system formed in accordance with the invention.

FIG. 1 is a pictorial diagram illustrating a tanker aircraft 21 and a receiver aircraft 22 shown in a coupled mode. Refueling of the receiver aircraft 22 is accomplished via an aerial boom 23 which is lowered from its stowage position beneath the fuselage of the tanker aircraft 21 so as to extend downwardly and rearwardly. Integrally attached to the boom is a horizontal lift surface called an elevator 24 which has a hinged trailing edge surface for control. A fixed fin 25 is attached to both outboard ends of the elevator 24. The fins 25 support the hinged rudders 26 and the rudder actuators not shown. The elevator 24 and the twin rudders 26 are used to control the position of the boom in elevation and azimuth. The actual axes of boom motion are determined by the boom attach mechanism 28. The particular embodiment illustrated herein provides a rolling boom pivot instead of the conventional yawing boom pivot. In this embodiment the boom axes of motion are pitch or vertical and a modified yaw or lateral motion which is actually an arc in the lateral plane. This modified yaw or lateral motion is identified herein as the roll axis and is to be distinguished from the conventional roll axis along the longitudinal axis of the body being controlled. However, the control system disclosed herein is applicable to any two axes of control and the conventional pitch and yaw control axes are suitable alternatives.

The outboard end portion 30 of the boom 23 is a telescoping section for inward and outward movement of the boom. Located on the distal end of the telescoping tube 30 is a nozzle 31. The receiver aircraft 22 is equipped with an aerial refueling receptacle 32 illustrated as being located in the receiver aircraft wing. Some receiver aircraft have the receptacle 32 located in the fuselage near the cockpit.

The boom operator 33, as shown in FIGS. 1 and 2, is located in the belly of the tanker aircraft 21 in position to observe the receiver aircraft 22. The boom operator 33 guides the receiver aircraft 22 via voice communication which may be supplemented by a light signal system, so as to align the boom nozzle 31 with the receiver receptacle 32. When the boom nozzle 31 is dynamically aligned with the receiver receptacle 32 the boom operator 33 extends the boom so that the nozzle 31 engages the receptacle 32 to complete the coupling. The coupling, of course, must be accomplished and maintained within a predetermined refueling envelope to avoid a disconnect. The dynamic alignment of the nozzle 31 and the receptacle 32 is accomplished by the boom operator 33 controlling the azimuth and elevation position of the boom 23 via the twin rudders 26 and the elevator 24 which are manipulated by the control stick 34. The telescoping portion of the boom 30 is controlled inwardly and outwardly by a separate actuator not shown. According to the prior art in-flight refueling techniques, once coupled, the boom operator 33 may either: (a) attempt to manually command the boom to compensate for relative excursions of either aircraft, (b) manually trim the boom control surfaces to neutral position without input control, or (c) engage a mechanical system which provides a predetermined proportional restoring force, via the control surface, tending to return the boom to its last position. None of these alternatives sense boom stress to alleviate loads. Should the relative motion of the receiver aircraft 22 with respect to the tanker aircraft 21 cause the boom to move outside the allowable refueling envelope, the nozzle 31 and receptacle 32 will disconnect. In the event of an inadvertent disconnect, the noted procedure must be repeated in order to accomplish another connection.

The invention provides an aircraft refueling boom control apparatus which provides for two basic modes of control. Generally, the first mode provides for precise manual control of the tanker boom 23 by the boom operator 33, through a handwrist motion of the control stick 34, which commands the elevator 24 and the twin rudders 26. This mode is generally employed to dynamically align the tanker nozzle 31 with the receiver receptacle 32 until the connection is made. During this mode the apparatus provides the boom operator with an adjustable "feel" feature.

The second mode, generally, is an automatic mode and takes over upon completion of the connection between the tanker nozzle 31 and the receptacle 32. Bending forces on the boom 23 along with boom position are fed back to drive the control stick 34 through the servo motor until the boom forces are nulled and the boom position and control stick correlate to alleviate loads in the boom 23.

The same servo motors and transducers (LVDT's) which provide "feel" in the manual mode are used to drive the control stick 34 in the automatic mode. Control stick movement, of course, results in control surface commands and finally boom control.

FIG. 3 is a simplified block diagram of one axis of the control system. The control stick is mechanically coupled to the moveable armature 50 of the linear voltage differential transformer (LVDT). The primary coil 51 of the LVDT is connected to an AC source. The secondary coils are connected in opposition, as shown, so that when the armature 50 is in its central position, equal voltages will be induced in both secondary coils 52. Since these coils are connected out of phase, the output will be zero. As the control stick is varied from its central position, LVDT armature 50 will move to the left or right inducing a greater voltage in one secondary coil and a lesser voltage in the other. The output, therefore, will either be in phase or 180° out of phase with the AC voltage on the primary and will vary in amplitude as the linkage and armature 50 vary from their central positions.

The output of the LVDT is applied to the signal conditioner and amplified in the boom control unit to drive a system of hydraulic actuators which positions the boom as a function of the position of the control stick. Position transducers supply an electrical signal proportional to the boom position to summing junction 53, closing the boom position loop.

The conditioned output of the LVDT is also applied through a servo amplifier and a servo motor which are connected to act as a polarity reverser so that the servo motor generates the force felt on the control stick. The force generated is opposite to the stick position because of the effective polarity reversal commonly known as negative feedback. Thus, as an example, as the control stick is continuously moved toward the right, an increasingly larger force to the left is generated by the servo motor and applied to the control stick. In its simplest embodiment, therefore, the servo motor simulates a spring. The variable gain circuit is provided to enable the operator to adjust the "spring constant" to the "feel" setting that he prefers.

Figure 5:
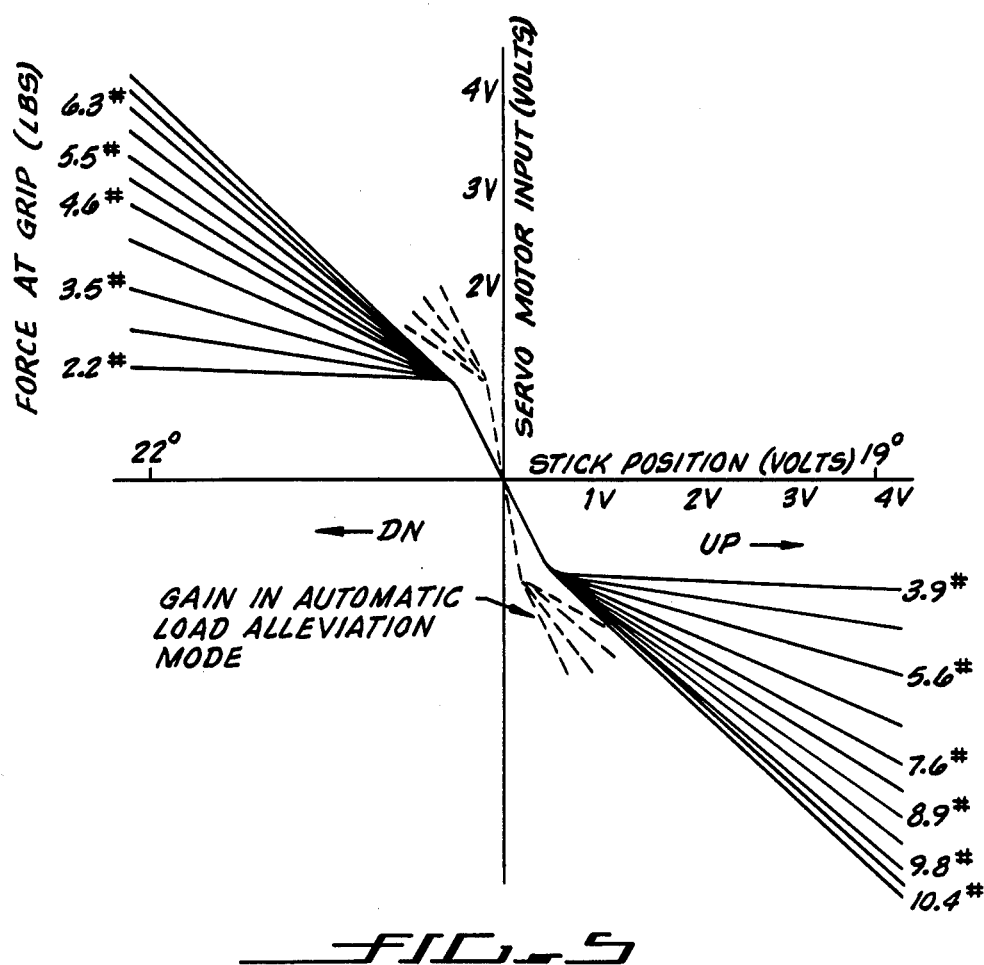
FIG. 5 is a graph of stick force at the grip versus displacement and reflects the feel force adjustment available to the operator; and, FIG. 6 shows the control mechanism of the invention, with portions cut away for clarity and the boom operator's arm and hand shown in phantom, and portions of the associated servo mechanism, all in side elevation.

The "feel" force curve range selectable and adjustable by the operator is shown by a family of curves in FIG. 5. The curve plots stick displacement in degrees with corresponding voltages against force in pounds (lbs) at the control stick hand grip. A fixed force gradient is shown near the control stick neutral position to minimize the controller deadband and improve centering. The dotted curves reflect an enhanced force gradient employed in the automatic load alleviation mode to minimize the effect of inadvertent bumping of the stick by the boom operator. The curves need not be symmetrical nor linear.

When the boom becomes seated in the receiver, switch 54 of FIG. 3 is closed bringing the summing junction 55 into the circuit. Electrical signals proportional to the boom position and force are now coupled through the summing junction 55 to summing junction 56. The amplitudes are such that the output from the summing junction 56 will be zero if the boom position corresponds exactly to the position of the control stick. Additionally, force transducers affixed to the boom supply an electrical signal to summing junction 55 and summing junction 56 proportional to the force exerted on the boom by a variation in position of the receiver with respect to the tanker. This force will unbalance the loop resulting in an output from the servo amplifier, and a force exerted by the servo motor on the control stick. Without interference by the operator the control stick will move under this force in the direction required to reduce the force on the boom. The motion of the control stick is coupled through the LVDT to the boom control hydraulics resulting in a change of boom control surface positions to reduce the forces being felt on the boom. The overall operation of the system in the coupled mode, therefore, is that the boom and the control stick both will be driven to that position which results in minimum force on the boom. That is to say, the boom will track the variations in position of the receiver.

This mode would appear to be the functional equivalent of a simple gimbal arrangement except that the operator can override the system by pushing the control stick to any arbitrary position in spite of the force exerted by the servo motor. In this case, the boom will be positioned as a function of the control stick position rather than a function of the force transducer output. The result is a boom positioning system which will follow the receiver but which can be overridden by the operator if necessary.

Figure 4:
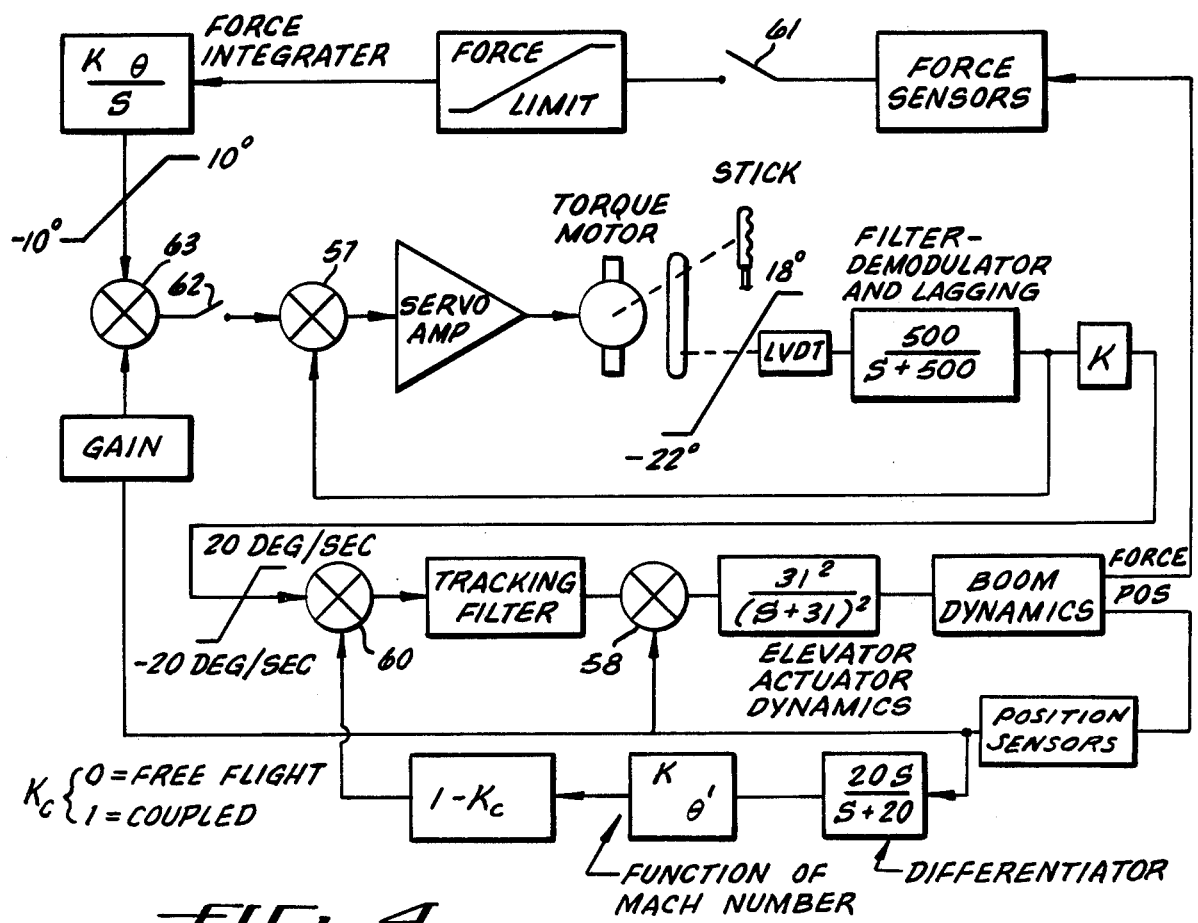
FIG. 4 is a control law diagram of the pitch control system as formed in accordance with the invention.

FIG. 4 is the control law diagram of one embodiment, a pitch control system. The torque motor, LVDT, and stick are mechanically coupled, as indicated by the dotted line. The output of the LVDT is an electrical signal corresponding to a command of any boom position between +18 degrees and −22 degrees. This is sent through a demodulator and lagging filter and is used to control the boom and to generate an opposing force at the stick. The opposing force is generated by transmitting the output of the lagging filter through summing junction 57 and through a servo amplifier to the torque motor which is connected to the stick. In this way, during the free flight mode of operation, an opposing force that is a function of the stick position will be produced.

The output of the lagging filter is also used to control the boom position. This is accomplished by multiplying the output of the lagging filter by a suitable constant to produce a rate signal, filtering out boom resonant frequencies in the tracking filter, and using this signal to control the elevator actuator. The elevator actuator dynamics and the boom dynamics produce boom forces and positions felt by force and position transducers respectively. The position output is fed back to summing junction 58 where it is compared against the commanded boom position. The resultant error is fed through the elevator actuator dynamics, closing the elevator actuator position loop.

The circuit also has a rate loop for greater control of the boom position. First, the position signal is coupled through a differentiator, producing a rate signal. This is then multiplied by a gain factor, $K_\theta'$, which is a function of aircraft speed to reduce the actuator response at higher aircraft speeds. This rate signal is then coupled to summing junction 60 (in the free flight mode only) to close the rate loop.

When the system switches from a free flight mode of operation to a coupled mode, switches 61 and 62 close. The closure of switch 62 couples boom position information through summing junctions 63 and 57 to the servo amplifier and torque motor. Thus, the electrical signal proportional to the stick position, summed against the electrical signal proportional to the boom position will result in a zero torque on the stick if the stick and boom positions are identical. To the extent that these positions are not identical, the system will tend to drive both stick and boom to positions of agreement.

In the coupled mode, the closure of switch 61 will apply the output of the boom force sensors through a force limiting circuit and through a force integrator circuit resulting in the translation of the force signal into a position error signal. This signal is limited to ±10 degrees and is summed in summing junction 63 along with the boom position signal. This signal is supplied through summing junction 57 as an input to the torque motor. Thus, even if the stick and boom positions are identical, a load on the boom will generate an unbalanced force on the stick tending to drive the stick and therefore the boom to a position which will minimize boom forces.

Figure 6:
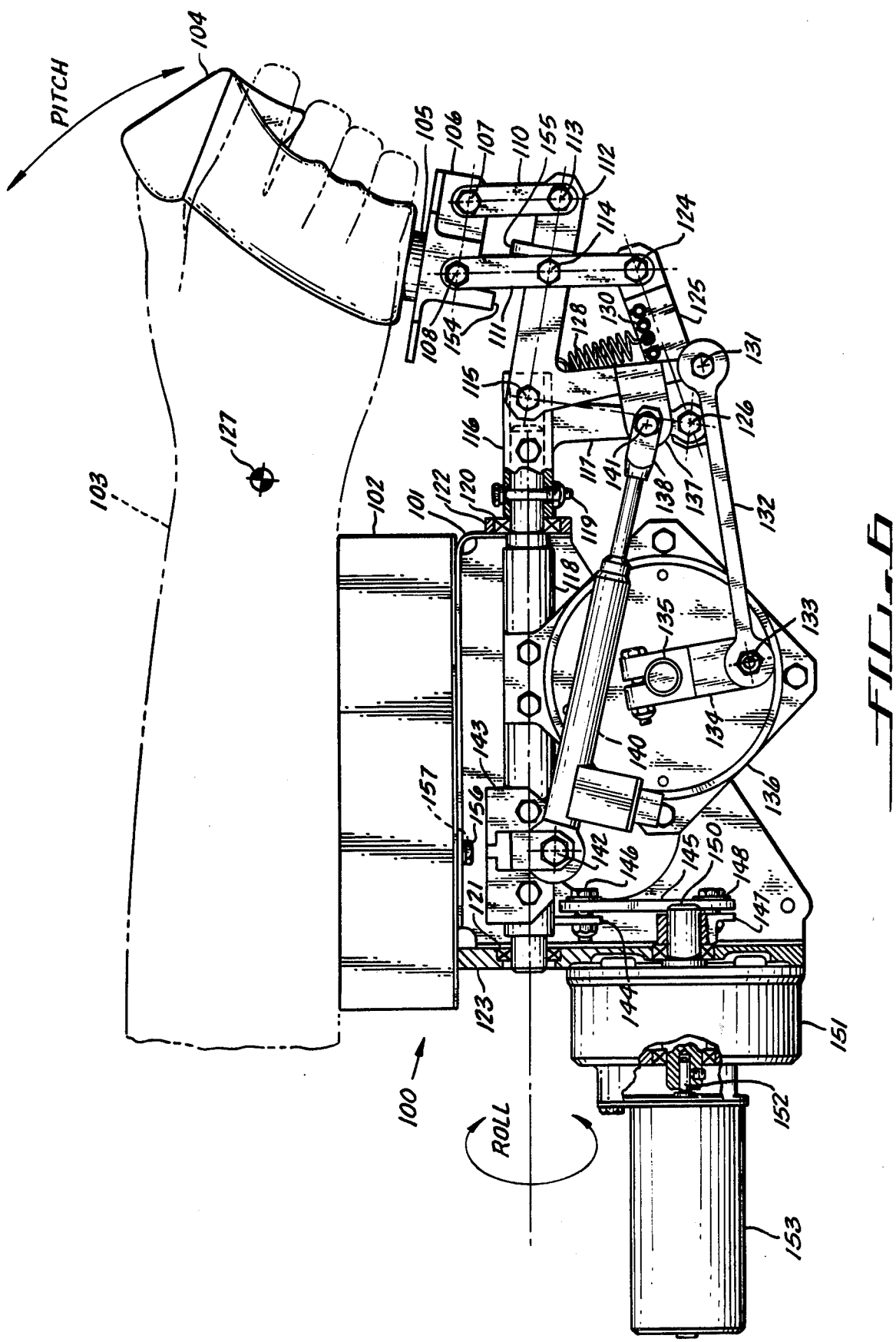

The control mechanism of FIG. 6 illustrates a reduction to practice of the concepts visualized by FIGS. 3 and 4.

The control mechanism comprises a controller 100 which is suitably mounted at the boom operators station, whether seated or prone, in spaced relationship to the boom operator's console so he may place his hand on the hand grip for rotation about two axes as explained hereafter.

The support frame 101 is fixedly secured to the tanker structure. The armrest 102 is attached to the upper surface of the support frame 101 to accommodate the boom operator's arm 103, shown in phantom, so as to allow his hand to comfortably grasp the handgrip 104 which forms the distal end of the control stick 105. The control stick 105 is fixed to the link 106, which is pivotally connected at either end, as at 107 and 108, to link 110 and rocker arm 111 respectively. The opposite end of the link 110 is pivotally attached to one end of the bell crank 112, as at 113. The same arm of the bell crank 112 also pivotally supports the intermediate pivot of rocker arm 111 at 114 to form the four bar linkage established by the pivot points 108, 107, 113, and 114. The bell crank 112 is also pivotally mounted, at 115, to the hub portion 116 of the hub arm 117. Hub arm 117 is attached to the shaft by a pair of bolt fasteners 119. The shaft 118 is supported by the bearings 120 and 121 which are supported by the bearing supports 122 and 123. The bearing supports, in turn, attach to the support frame 101 which in turn is fixed to the tanker structure. Therefore, the pivot pin at 115 acts as a fulcrum as to the pitch axis but permits freedom of rotation about the center line of the shaft 118 which corresponds with the roll axis command. The other end of the rocker arm 111 is pivotally connected at 124 to the link 125 which in turn is pivotally connected at 126 to the hub arm 117. The apparatus thus forms a second four bar linkage described by the pivot point 115, 114, 124, and 126 which combines with the previously described parallel four bar linkage. Although the linkage moves about the fixed link 117, the virtual pivot point for the hand grip 104 is translated via the linkage to concide approximately with the operator's wrist at 127. This translation of the virtual center of rotation with respect to the handgrip 104 permits the operator to induce pitch axis commands, without arm movement, by simply rotating the hand containing the handgrip 104 about the operator's wrist.

The linkage is biased by a spring 128 adjustably connected to the link 125 and the distal end of the hub portion 116 of the hub arm 117. The amount of bias is established by selecting the 128 spring attach point from a series of apertures 130 in the link 125 which is selected to counterbalance the moments of the forces acting about the pivot point 115 caused by the weight of the linkage, the control stick 105 and the handgrip 104.

The other end of the bell crank 112 is pivotally connected at 131 to the connecting rod 132, which in turn is pivotally connected at 133 to the crank 134. The other end of the crank 134 is fixed to the shaft 135 of the servo motor 136. The servo motor 136 is fixedly attached to the shaft 118 which, as previously described, is fixed to the structure of the tanker aircraft in all axes except the axis of the rotation about the center line of the shaft 118.

The bell crank 112 is further provided with a tab 137 to pivotally attach the clevis end 138 of the transducer 140, herein an LVDT, at 141. The other end of the transducer 140 is pivotally attached at 142 to the bracket 143 which in turn is fixed to the shaft 118. Again, the shaft 118 provides for restraint with respect to the tanker structure in all directions except the axis of rotation of the shaft 118.

Thus, in the manual mode, the planar movement of the handgrip 104 by rotation of the boom operator's hand about his wrist at 127 results in a motion generally as indicated by the pitch arc, FIG. 6. This motion through the linkage rotates the bell crank 112 about the fulcrum at 115, as previously described. Rotation of the bell crank 112 produces an in-out movement of the LVDT transducer 140 and rotation of the servo motor shaft 135. Movement of the LVDT transducer produces a differential voltage which is transmitted to the elevator control actuator for command of the elevator surface 24 which controls the boom 23 in the pitch axis. The output of the LVDT is also applied to the pitch control servo motor 136. This output produces a resisting torque in the servo motor, opposed to the stick motion, to create the operator "feel".

Alternatively, when the tanker and receiver aircraft are coupled and the control is in the automatic mode, boom position and loads are sensed and fed back as an error command to the servo motor 136. In the absence of stick control by the operator, the servo motor will respond to the error command and drive the stick 105 through the controller linkage, to null the error.

The second degree of control, the roll axis command, is initiated by rotation of the operator's arm 103 with his hand grasping the handgrip 104. This motion imparts rotation to the control stick 105, the entire pitch axis control linkage, (since it is attached to the shaft 18, as previously described) and the shaft 118, about its longitudinal center line.

The bracket 143 which is fixedly attached to the shaft 118 is provided with an arm 144, which is pivotally attached to the rod 145 at 146. The other end of the rod 145 is pivotally attached to the crank 147 at 148. Crank 147, in turn, is fixed to one end of the shaft 150 of the servo motor 151. The servo motor 151 is fixed to the bearing support 123, which in turn is fixed to the support frame 101. The other end of the servo motor shaft 150 is coupled to the shaft 152 of the roll position transducer 153. The housing of the roll position transducer 153 is in turn fixed to the roll servo motor housing 151.

Hence, rotation of the handgrip 104 about a longitudinal axis generally under the operator's forearm results in rotation of the roll axis position transducer 153 and servo motor 151. Rotation of the transducer 153, herein a linear voltage differential transducer (LVDT), produces a differential voltage which is transmitted to the rudder control actuator for command of the twin rudder control surfaces 26 which controls the boom 23 in the roll axis. The output of the LVDT is also applied to the roll control servo motor 151, to produce an equilibrant torque in the servo motor in opposition to the stick motion and thus create operator "feel".

As previously described for the pitch axis, when the aircraft is coupled and the control is in the automatic mode, boom position and loads are sensed and fed back as an error command to the servo motor 151. In the absence of stick control by the operator, the servo motor will respond to the command and drive the stick 105 through the controller linkage to null the error. Again, as in pitch control, the operator may override the error command by moving the stick control.

While the apparatus has been described in planar motion in each axis of control for the sake of simplicity, it is obvious that the intent of the apparatus is for co-planar motion and control. In fact, the apparatus is intended to control boom position in both pitch and roll, individually or concurrently, by moving the control stick 105 from neutral to full throw in all directions. Full throw in both axes of control is nominally plus or minus 20° of rotation from neutral which is limited by the mechanical stops 154 and 155 in the pitch axis and 156 and 157 (identical to, and hidden by 156 except displaced behind 156 and symetrical about the centerline of the shaft 118) in the roll axis. Obviously, the full range of motion of the control stick 105 must correspond with the full range of motion of the corresponding control surface.

It should now be apparent that the initially discussed difficulties and disadvantages are eliminated because the boom position is automatically controlled to alleviate loads in the boom during refueling, which minimize disconnect transients and boom whip upon disconnect. Although subject to operator override at any time, the command is automatic. Since it is back driven, the control stick corresponds with the automatic command and presents the operator with a kinesthetic indication of the automatic command at all times. Further, the invention provides a control mechanism with an adjustable electrosimulated feel system which provides easy and accurate control of the boom by a boom operator.

What is claimed is:

1. An apparatus for controlling a mechanical element in angular or translational position, comprising:
   a control stick;
   position transducer means driven by said control stick for generating a command signal that is a function of said control stick position;
   actuator means responsive to said command signal for driving said mechanical element;
   servo motor means for receiving said command signal and applying an inverse force to said control stick proportional to said command signal;
   force transducer means for measuring force on said mechanical element and generating a force signal that varies as a function of said force, and;
   switching means for selectively adding said force signal to said command signal applied to said servo motor;
   whereby the force on said control stick varies inversely as a function of said stick position alone or stick position in conjunction with the force on said mechanical element depending on said switching means position.

2. The apparatus as defined in claim 1, further comprising a second position transducer driven by said mechanical element for generating an actual position signal that is a function of actual position of said mechanical element and selectively applied through said switching means, in algebraic combination with said force signal and said command signal to said servo motor means, whereby the force on said control stick is further biased by said actual position of said mechanical element.

3. An apparatus for controlling a mechanical element in angular or translational position, comprising:
   a control stick;
   first position transducer means driven by said control stick for generating a command signal that is a function of said control stick position;
   actuator means responsive to said command signal for driving said mechanical element;
   second position transducer means driven by said mechanical element for determining the actual position of the mechanical element and generating an actual position signal;
   force transducer means for measuring force on said mechanical element and generating a force signal that varies as a function of said force;
   first summing means for summing said actual position signal and said force signal;
   switching means connnected to said first summing means output to enable or disable said output;
   second summing means connected to said switching means for subtracting said command signal from said switching means output, resulting thereby in a control signal, and
   servo motor means responsive to said control signal to apply a force to said control stick that is a function of said control signal,
   whereby the force on said control stick is always a function of said command signal and may be biased by said actual position signal and said force signal by closing said switching means.

4. The apparatus as defined in claim 3, wherein said second position tranducer output is also coupled to said actuator, and said actuator compares said first position transducer output to said second position transducer output, determines the polarity and amount of error, and drives said mechanical element in a direction to reduce said error.

5. A two axes controller for imparting command signals to a mechanical element for angular or translational position control comprising:
   armrest means adapted to support the forearm of the operator;
   a handgrip located forward and above said armrest adapted to be grasped by the hand of the operator while supporting the forearm on said armrest;
   first moveable member pivotally mounted to said armrest means for angular motion in a plane about an axis of rotation located below and parallel to the longitudinal axis of said armrest and corresponding to the lateral axis of the mechanical element being controlled;
   second moveable member pivotally mounted at one end to said first moveable member and supporting said handgrip at the other end for angular motion in a plane perpendicular to the plane of motion of said first moveable member and allowing said handgrip to move about an axis approximately coinciding with the wrist of the operator and corresponding to the vertical axis of motion of the mechanical element being controlled;
   signal generating position transducer means connected to each of said moveable members and driven by said handgrip for generating a command signal that is a function of said handgrip position; and
   servo motor means connected to each of said moveable members and responsive to each of said signal generating position transducers output signal to apply a force to said handgrip as an inverse function of said command signals,
   whereby the operator will experience a force resisting the movement of said handgrip from neutral position which is a function of said handgrip displacement.

6. A two axes controller for controlling a tanker aircraft in-flight refueling boom, having aerodynamically responsive surfaces for maneuvering said boom before and after engagement with a receivng aircraft comprising:
   armrest means adapted to support the forearm of the operator;
   a handgrip located forward and above said armrest adapted to be grasped by the hand of the operator while supporting the forearm on said armrest;
   first moveable means pivotally mounted to said armrest means for angular motion in a plane about an axis of rotation located below and parallel to the longitudinal axis of said armrest and corresponding to the lateral axis of the boom;
   second moveable means pivotally mounted at one end to said first moveable means and supporting said handgrip at the other end for angular motion in a plane perpendicular to the plane of motion of said first moveable means and allowing said handgrip to move about an axis approximately coinciding with the wrist of the operator and corresponding to the vertical axis of motion of the boom being controlled;

signal generating position transducer means connected to each of said moveable means and driven by said handgrip for generating a first and a second command signal, corresponding to each axis of control, proportional to said handgrip position, and wherein each axis further comprises:

actuator means responsive to said command signal for controlling said boom control surface;

servo motor means connected to each of said moveable means for receiving said corresponding command signal and applying an inverse force to said handgrip that is a function of said command signal;

force transducer means attached to said refueling boom for measuring forces on said boom and generating a force signal that is a function of said force, and;

switching means for selectively adding said force signal to said command signal applied to said servo motor;

whereby the force on said handgrip will be an inverse function of said handgrip position alone or said force will be biased by the forces acting on said boom depending on said switching means position.

7. The apparatus as defined in claim 6, further comprising a boom position transducer means connected to each axis of motion of said boom for generating an actual position signal proportional to actual boom position, selectively applied through said switching means in algebraic combination with said force signal and said command signal to said corresponding axis servo motor means, whereby the forces on said handgrip are further biased by said actual position of said boom.

8. The apparatus as defined in claim 7, wherein said switching means for adding said combined force signal and said actual boom position with said command signal for application to said servo means is automatically closed when said boom is engaged with said receiving aircraft.

9. A two axes controller for controlling a tanker aircraft in-flight refueling boom, having aerodynamically responsive surfaces for maneuvering said boom before and after engagement with a receiving aircraft comprising:

armrest means adapted to support the forearm of the operator;

a handgrip located forward and above said armrest adapted to be grasped by the hand of the operator while supporting the forearm on said armrest;

first moveable means pivotally mounted to said armrest means for angular motion on a plane about an axis of rotation located below and parallel to the longitudinal axis of said armrest and corresponding to the lateral axis of the boom;

second moveable means pivotally mounted at one end to said first moveable means and supporting said handgrip at the other end for angular motion in a plane perpendicular to the plane of motion of said first moveable means and allowing said handgrip to move about an axis approximately coinciding with the wrist of the operator and corresponding to the vertical axis of motion of the boom being controlled;

first position transducer means connected to each of said moveable means and driven by said handgrip for generating a first and a first prime command signal, corresponding to each axis of control, proportional to said handgrip position, and wherein each axis further comprises:

(1) actuator means responsive to said command signal for driving said boom;

(2) second position transducer means driven by said boom for determining the actual position of the boom and generating an actual boom position signal;

(3) force transducer means for measuring force on said boom and generating a boom force signal proportional to said force;

(4) first summing means for summing said actual boom position signal and said boom force signal;

(5) switching means connected to said first summing means output to enable or disable said output;

(6) second summing means connected to said switching means for subtracting said command signal from said switching means output, resulting thereby in a control signal, and (7) servo motor means connected to said corresponding moveable means and responsive to said control signal to apply a force to said handgrip proportional to said control signal, whereby the force on said handgrip is always a function of said handgrip position and may be biased by the forces acting upon said boom by closing said switching means.

10. The apparatus as defined in claim 9, wherein said actual boom position signal is also coupled to said actuator, and said actuator compares said first position transducer output to said actual boom position signal, determines the polarity and amount of error, and drives said boom in a direction to reduce said error.

11. The apparatus as defined in claim 11, wherein said first moveable means is a shaft journaled for rotation, and wherein said second moveable means is a linkage, further comprising:

(1) a first link rigidly fixed to said shaft in a vertical plane when said shaft is in a neutral control position;

(2) a second link pivotally connected to the lower end of said first link;

(3) a first rocker arm pivotally connected at one distal end to said second link;

(4) a second rocker arm pivotally connected at the upper end of said first link and pivotally connected at its intermediate point to the intermediate point of said first rocker arm to form a first four bar linkage having two protruding arms;

(5) a third link pivotally attached to the distal end of the protruding arm of said second rocker arm; and (6) a fourth link pivotally attached to the protruding arm of said first rocker arm at one end and pivotally attached to said third link at the other end and supporting said handgrip on its upper surface to form a second four bar linkage having a common pivot with said first four bar linkage, whereby a linkage is formed for translating motion to said handgrip in an arc described about a point approximately coincidental with the wrist of the operator for boom pitch axis control and rotation of said linkage, by a roll motion of the forearm of the operator, about said shaft for roll control.

12. The apparatus as defined in claim 11, further comprising:

a spring biasing means connected between said shaft and said second link for counterbalancing the weight of said linkage and handgrip.

* * * * *